United States Patent
Maor

(10) Patent No.: US 11,397,805 B2
(45) Date of Patent: Jul. 26, 2022

(54) LATERAL MOVEMENT PATH DETECTOR

(71) Applicant: Microsoft Technology Licensing, LLC, Redmond, WA (US)

(72) Inventor: Tal Joseph Maor, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 680 days.

(21) Appl. No.: 16/408,091

(22) Filed: May 9, 2019

(65) Prior Publication Data
US 2020/0356664 A1 Nov. 12, 2020

(51) Int. Cl.
*G06F 21/55* (2013.01)
*G06F 21/31* (2013.01)
*H04L 9/40* (2022.01)

(52) U.S. Cl.
CPC .............. *G06F 21/55* (2013.01); *G06F 21/31* (2013.01); *H04L 63/0428* (2013.01); *H04L 63/10* (2013.01)

(58) Field of Classification Search
CPC .......... G06F 21/31; G06F 21/44; G06F 21/55; G06F 21/552; G06F 21/566; G06F 21/577; H04L 63/08; H04L 63/10; H04L 63/102; H04L 63/104; H04L 63/14; H04L 63/1416; H04L 63/1433; H04L 63/145; H04L 2463/146
See application file for complete search history.

(56) References Cited

U.S. PATENT DOCUMENTS

| | | | | |
|---|---|---|---|---|
| 7,013,395 | B1* | 3/2006 | Swiler | H04L 63/1433 713/153 |
| 7,617,320 | B2* | 11/2009 | Alon | H04L 67/1097 709/200 |
| 8,020,194 | B2* | 9/2011 | Lambert | H04L 63/1433 709/252 |
| 9,699,205 | B2 | 7/2017 | Muddu et al. | |
| 2009/0285120 | A1* | 11/2009 | Swan | H04L 41/12 370/254 |
| 2010/0058456 | A1* | 3/2010 | Jajodia | G06F 21/552 726/11 |
| 2010/0192226 | A1* | 7/2010 | Noel | H04L 41/12 726/25 |
| 2014/0040300 | A1* | 2/2014 | Narayanan | G06F 3/0482 707/758 |
| 2014/0359776 | A1* | 12/2014 | Liu | H04L 63/14 726/25 |

(Continued)

OTHER PUBLICATIONS

Fender, Sarah "The Microsoft Graph Security API is now generally available" [Online], Sep. 25, 2018 [Retrieved: Feb. 19, 2022], Retrieved from: < https://techcommunity.microsoft.com/t5/security-compliance-and-identity/the-microsoft-graph-security-api-is-now-generally-available/ba-p/254128 > (Year: 2018).*

(Continued)

*Primary Examiner* — Eric W Shepperd
(74) *Attorney, Agent, or Firm* — Wade IP Law PLLC

(57) ABSTRACT

A lateral movement path detector is disclosed. Data is gathered via programmatic access to a management service director through a REST API endpoint. The data is grouped into a graph having nodes of users, groups, and devices. The nodes coupled together via edges. A visualization of the graph is provided to illustrate lateral paths of the management service directory.

20 Claims, 5 Drawing Sheets

(56) References Cited

U.S. PATENT DOCUMENTS

| | | | | |
|---|---|---|---|---|
| 2016/0065601 A1* | 3/2016 | Gong | ............... | H04L 63/145 |
| | | | | 726/23 |
| 2016/0088000 A1 | 3/2016 | Siva et al. | | |
| 2016/0203327 A1* | 7/2016 | Akkiraju | ............ | G06F 21/6227 |
| | | | | 707/785 |
| 2017/0353453 A1* | 12/2017 | Hutchinson | ............ | H04L 63/10 |
| 2018/0041467 A1 | 2/2018 | Vats et al. | | |
| 2019/0334928 A1* | 10/2019 | Sela | ............... | G06F 21/552 |

OTHER PUBLICATIONS

Thake et al. "Overview of Microsoft Graph" [Online], Web page <docs.microsoft.com/en-us/graph/office365-groups-concept-overview>, Jan. 29, 2019, retrieved from Internet Archive Wayback Machine < https://web.archive.org/web/20190129234447mp_/https://docs.microsoft.com/en-us/graph/overview > <cont.> (Year: 2019) on Feb. 19, 2022 (Year: 2019).*

Xiaohong et al., "Approach to Attack Path Generation based on Vulnerability Correlation" [Online], Apr. 10, 2014 [Retrieved on: Feb. 20, 2022], www.ieee.org, Retrieved from < https://ieeexplore.ieee.org/stamp/stamp.jsp?tp=&arnumber=6784925 > (Year: 2014).*

Mutually Human, "An Updated Look at Choosing Between OAuth2 and SAML" [Online], Jan. 17, 2019, [Retrieved: Feb. 26, 2022], Retrieved from: < www.mutuallyhuman.com/blog/an-updated-look-at-choosing-between-oauth2-and-saml/ > (Year: 2019).*

Geesaman, Brad, "Detecting Malicious Cloud Account Behavior: A Look at the New Native Platform Capabilities @bradgeesaman", Retrieved From: https://i.blackhat.com/us-18/Thu-August-9/us-18-Geesaman-Detecting-Malicious-Cloud-Account-Behavior-A-Look-At-The-New-Native-Platform-Capabilities.pdf, Aug. 4, 2018, 86 Pages.

"International Search Report and Written Opinion Issued in PCT Application No. PCT/US20/025094", dated Jun. 16, 2020, 11 Pages.

Wilson, Jason, "Reduce Your Potential Attack Surface Using Azure ATP Lateral Movement Paths", Retrieved From: https://techcommunity.microsoft.com/t5/microsoft-security-and/reduce-your-potential-attack-surface-using-azure-atp-lateral/ba-p/291787, Nov. 27, 2018, 5 Pages.

Flores, et al., "How to manage the local administrators group on Azure AD joined devices", Retrieved from: https://docs.microsoft.com/en-us/azure/active-directory/devices/assign-local-admin, Jan. 8, 2019, 3 Pages.

* cited by examiner

LATERAL MOVEMENT PATH DETECTOR

BACKGROUND

An aspect of computer security involves protecting against unauthorized access to secure computer networks including network lateral movement. Network lateral movement, or simply "lateral movement," refers to techniques that cyber attackers or threat actors use to progressively move through a computer network to search for data and assets that are the targets of the attack campaign. Lateral movement attacks involve attackers exploiting non-sensitive accounts of a network by such techniques as Pass the Ticket or credential theft and then making lateral moves to more sensitive accounts, groups, or machines that share stored log-in credentials. Once the attackers obtain access to the sensitive accounts, groups, or machines, the attackers can gain access to ultimate targets, such as domain controllers, of the network.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The present disclosure is directed to a lateral movement path detector. The lateral movement detector can provide lateral movement paths and visualizations for cloud tenants or domains that make extensive use of external resources and assets, such as web-based services that use REST API interfaces. Data is gathered via programmatic access to a management service director through a REpresentational State Transfer (REST) application programming interface (API) endpoint. The data is grouped into a graph having nodes of users, groups, and devices. The nodes coupled together via edges. A visualization of the graph is provided to illustrate lateral paths of the management service directory.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
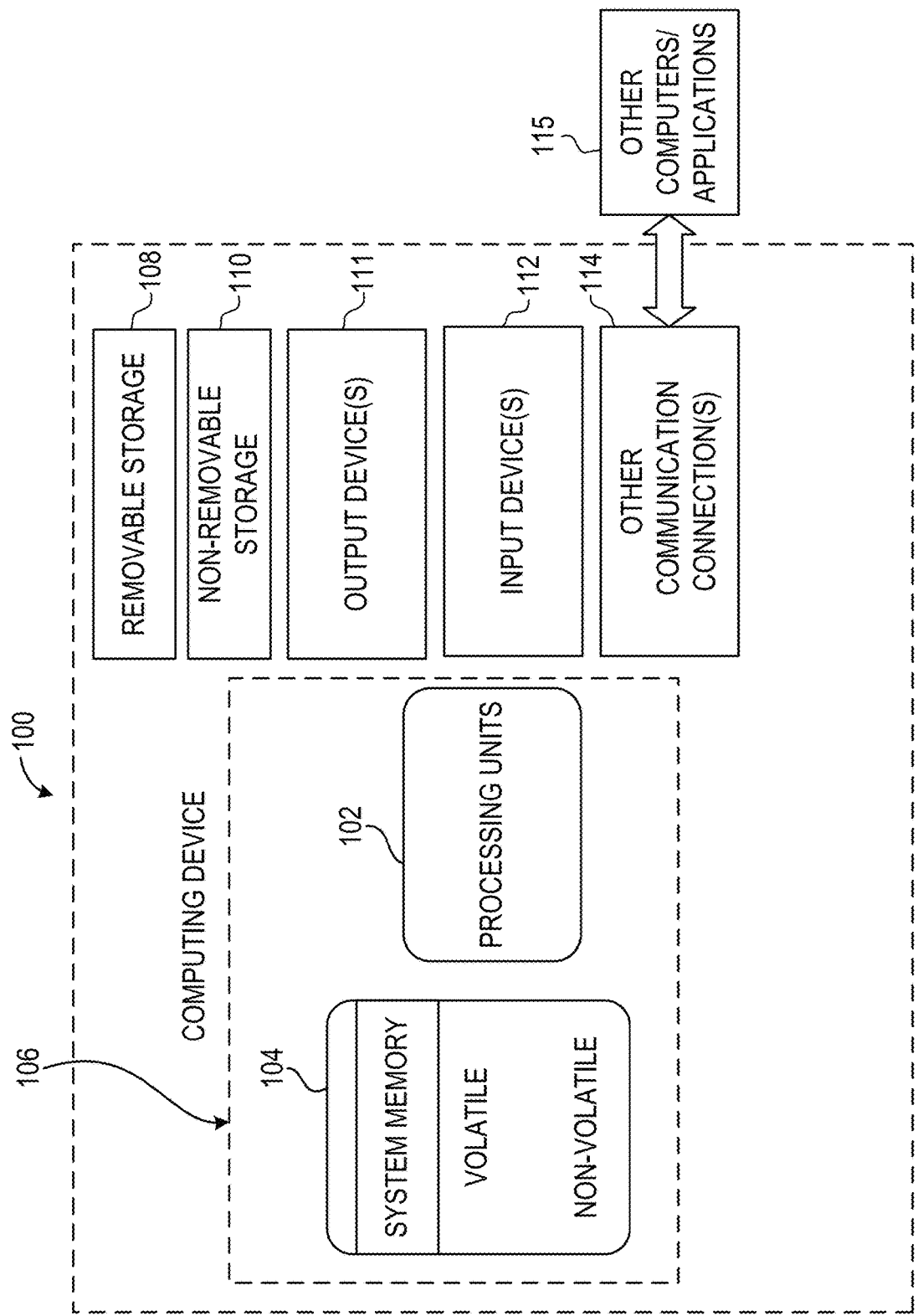
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units 106, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, electrically erasable programmable read-only memory (EEPROM), flash memory or other memory technology, compact disc-read only memory (CD-ROM), digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

A domain is a form of a computer network in which all user accounts, computers, printers and other security principals, are registered with a central database located on one or more clusters of central computers known as domain controllers. Authentication takes place on domain controllers. In one example, each user within a domain receives a unique user account that can then be assigned access to resources within the domain. A domain network can make sure of a domain directory service. In one example, a domain directory service is a type of database that can organize resources of the computer network and can provide authentication and authorization to applications file service, printers and other on-premises resources. A domain directory service or name service maps the names of network resources to their respective network addresses. The domain directory service is a shared information infrastructure for locating, managing, administering and organizing everyday items and network resources, which can include volumes, folders, files, printers, users, groups, devices, telephone numbers and other objects. The domain directory service can consider each resource on the network an object. Information about a particular resource is stored as a collection of attributes associated with that resource or object. One example of a domain directory service is available under the trade designation Active Directory Domain Service from Microsoft, Corporation, or Redmond, Wash. An example domain directory service can authorize all users and computers in a domain type network, which can include assigning and enforcing security policies for all computers and installing or updating software. For example, when a user logs into a computer that is part of the domain, the domain directory service checks the submitted password and determines whether the user is a system administrator or normal user. Also, it allows management and storage of information, provides authentication and authorization mechanisms, and establishes a framework to deploy other related services such as Certificate Services, Federated Services, Lightweight Directory Services and Rights Management Services. In one example, the domain directory service uses protocols such as Kerberos and New Technology Local Area Network Manager (NTLM) for authentication and Lightweight Directory Access Protocol (LDAP) to query and modify items in the domain directory service.

Lateral movement attacks of on-premises domains involve attackers exploiting non-sensitive accounts of a network by such techniques as Pass the Ticket or credential theft and then making lateral moves to more sensitive accounts, groups, or machines that share stored log-in credentials. Once the attackers obtain access to the sensitive accounts, groups, or machines, the attackers can gain access to the domain controllers. Lateral movement paths include visual guides that identify how an attacker can move laterally within a network such as via the domain directory service. Visual guidance of vulnerable and sensitive accounts in the domain helps security professionals mitigate the risk of an attack or to identify the source of attacks. Lateral movement paths can be developed with on-premises networks via types of client-server protocols, such as LDAP (Lightweight Directory Access Protocol), SAMR (Security Account Manager Remote protocol), and SMB (Server Message Block), through session enumeration to each account in the domain.

Such techniques to develop lateral movement paths and visualizations, however, are not available to cloud tenants or domains that make extensive use of external resources and assets, such as web-based services that use REST API interfaces.

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack. A multi-tenant cloud is a cloud computing architecture that allows customers to share computing resources in a public or private cloud. Each tenant's data can be isolated and remain invisible to other tenants.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models. In a private cloud, the customers, who are also called tenants, can be different business divisions inside the same company. In a public cloud, the customers are often entirely different organizations. Many public cloud providers use the multi-tenancy model. It allows them to run one server instance, which is less expensive and makes it easier to deploy updates to a large number of customers.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
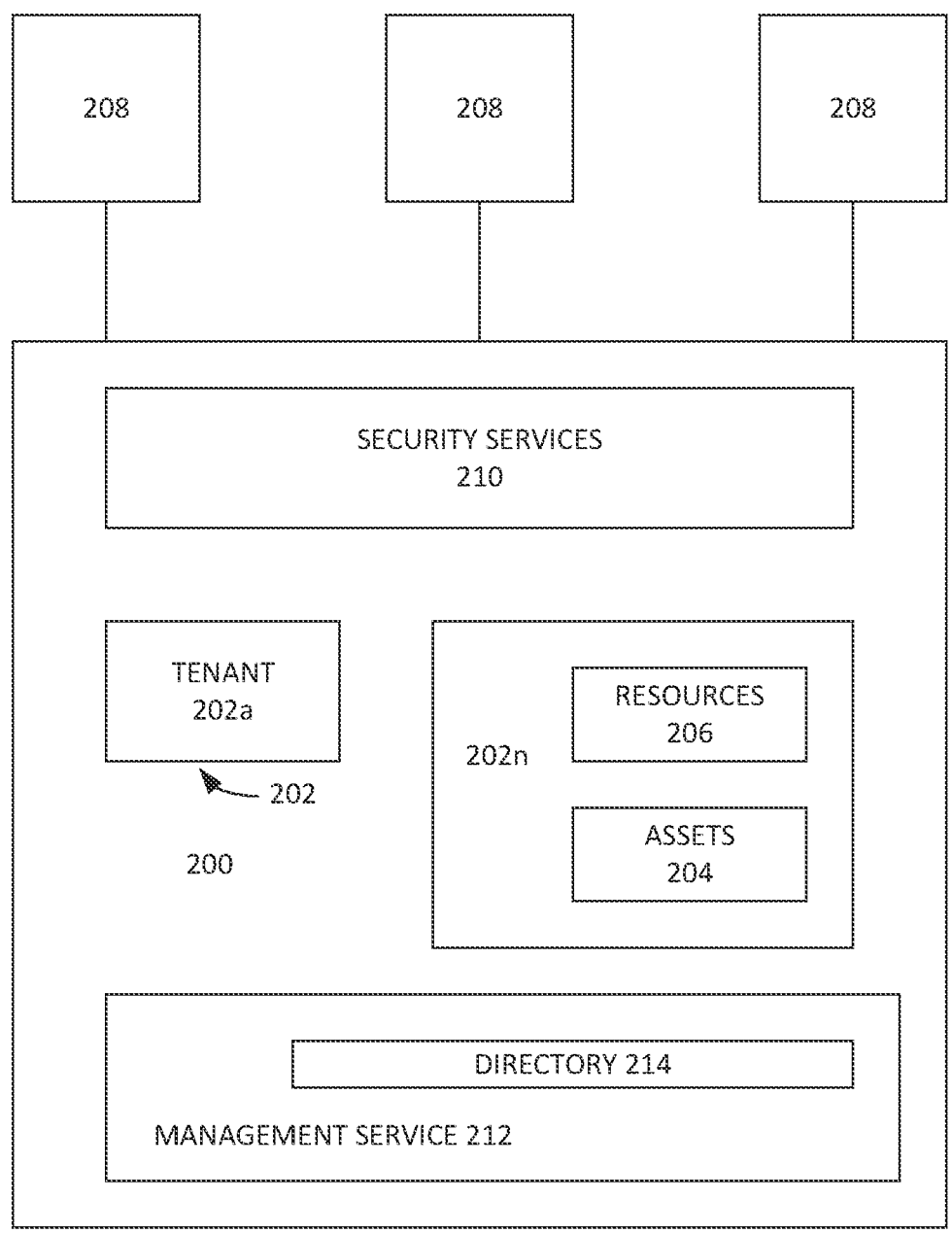
FIG. 2 is a schematic diagram illustrating an example a cloud-computing environment.

FIG. 2 illustrates an example a cloud-computing environment 200, such as a public cloud, to deploy applications and data on a platform and infrastructure across selected datacenters. In the illustrated example, the environment 200 can provided capability to a cloud tenant 202, such as one or more cloud tenants 202a-202n, to deploy applications and data as cloud-based assets 204 to the cloud computing environment 200 and address infrastructure issues. The environment 200 includes, or includes access to, resources 206 available from one or more resource providers. A resource 206 can include a component of the application to be provisioned in a platform subscription and provides an item of the platform solution. Examples of resources 206 can include virtual machines, databases, virtual networks, and others. Resources 206 can be user-managed entities, entities automatically managed by a platform with the cloud environment 200, or a combination of user-managed and automatically managed entities. Resource providers include services that provide resources for the cloud-based assets 204. Resource providers include services to create, configure, and manage operations for working with the resource 206. Examples of resource providers include a compute provider to supply a virtual machine resource, storage provider to supply a storage account resource, web provider to supply resources related to web applications, and other resource providers.

Cloud tenants 202a-202n typically can communicate with other devices, including each other or with devices 208 located outside the cloud environment 200 via a network, such as the internet. In one example the cloud tenants 202a-202n can communicate with other devices via assigned network addresses, such as an assigned internet protocol (IP) addresses. In one example, a user of a device 208 can log in to a cloud tenant of cloud tenants 202a-202n, and access cloud-based assets 204 and resources 206 from the cloud environment 200. In some examples, the cloud-based assets 204 or resources 206 are available to authorized users, and the user may have further restrictions via permissions from a set of permission levels to each authorized user for each resource in the cloud environment 200. The cloud environment can also include a manager or service that provisions user accounts, tracks user accounts, and logs events or operations of the users via the accounts.

Cloud environment 200 also includes security services 210 to protect and secure the cloud-based assets 204 and resources 206 from malicious communication or other threats. In one example, the security services 210 can include controls to manage and configure the security of the assets 204 and resources 206 in order to customize the security for the tenants 202a-202n. Security services 210 can include isolation features to prevent unauthorized or unintentional transfer of data between deployments of a multi-tenant architecture. Additionally, security services 210 can include network and endpoint protection in the form of firewalls and virtual firewalls. For example, security services 210 can include a network group virtual firewall feature to control network traffic to instances of virtual machines. Additionally, security service 210 can provide for logging and monitoring events including security-related events with agents on each compute, storage, or fabric node in environment. Security services 210 can include a computer readable storage device, such as a suite of computer readable storage devices, to store computer executable instructions to control a processor, such as a server in a datacenter. For example, security services 210 can be implemented as part of an infrastructure or platform as a service such as for a cloud tenant 202a, 202n.

Cloud environment 200 can also include a cloud-based identity and access management service, or management service 212. Management service 212 helps users log onto and access the assets 204 and resources 206 of a cloud tenant including external resources such as software as a service applications and applications on the tenant's network and intranet such as with a single sign on (SSO). In one example, management service 212 can provide similar features as a domain directory service such as Users Groups and Authentication and Authorization, however, domain directory services are unable to manage web-based services while management service 212 is configured to support web-based services that apply REST (REpresentational State Transfer) API interfaces for many software as a service applications. Management service 212 applies different protocols than the domain directory service. For example, management service 212 applies protocols that can work with web-based services such as authentication protocols including Security Assertion Markup Language (SAML), Open Authorization (OAuth), an identity layer on top of OAuth protocol such as OpenID Connect, and Web Services Federation (WS-Federation). In one example, each tenant 202 can apply an instance of the management service 212, such as a management service directory 214 for the tenant 202. The management service directory 214 of management service 212 that can be configured to include the tenant's users, groups, and applications and can be applied to perform identity and access management functions for the tenant's assets 204 and resources 206.

Figure 3:
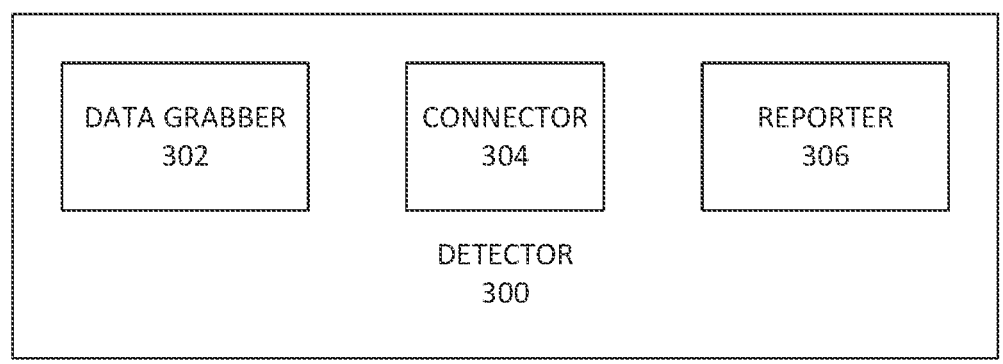
FIG. 3 is a schematic diagram illustrating an example lateral movement path detector, which can be included as a service in the cloud computing environment of FIG. 2.

FIG. 3 illustrates a lateral movement path detector 300, which in one example, can be incorporated into security services 210 and applied to management service 212. The lateral movement path detector 300 can be employed to investigate potential lateral movement paths, in some cases that can be used by attackers, for security professionals to gain an understanding of the cloud-based network. Further, the lateral movement path detector 300 can be employed to discover sensitive accounts in the network that may be exposed because of a connection to non-sensitive accounts, groups, or devices in lateral movement paths. In one example, the lateral movement path detector 300 can provide a visual guide to identify how attackers can move laterally within the network and to identify sensitive accounts. The lateral movement path detector 300 can include a computer readable storage device to store computer executable instructions to control a processor, such as a server in a datacenter. In one example, lateral movement path detector 300 can be implemented as part of an infrastructure or platform as a service such as for a cloud tenant 202a, 202n. In another example, lateral movement path detector 300 can be implemented as a software as a service such as for subscribers in other clouds, hybrid clouds, or private networks. In one example, the lateral movement path detector 300 can be implemented as a computer program to run a processor.

The lateral movement path detector 300 includes a data grabber 302, connector 304, and reporter 306. Detecting lateral movement paths with management service 212 is distinct from detecting lateral movement paths in a domain directory service. For example, information on a local administrator in a domain directory service can be collected via a SAML query for each device in the domain. Such queries are not useful with management service 212 in part because the users, or accounts, groups, and devices have different representations in the management service directory 214. For instance, when a device is added to the management service directory 214, default groups of local administrators are added to the device as part of the registration of the machine, which cannot be detected with SAML queries or queries of domain directory service. In order to identify lateral movement paths for cloud-based identity and access management services, such as management service 212, data regarding the users, devices, on logon sessions is retrieved with data grabber 302 including an application programming interface (API) that provides access to web services via a public endpoint. In one example, the data grabber 302 can employ REST calls and secure permissions with OAuth protocols. An example unified API endpoint and management service directory identity protection API is available under the trade designation Graph API, from Microsoft, Corporation, which can provide programmatic access to a management service directory 214 of management service 212 such as one available under the trade designation Azure Active Directory, from Microsoft, Corporation, through REST API endpoints. An instance of the GraphServiceClient class handles building requests, sending the requests to data grabber 302, and processing the responses in connector 304. Data grabber 302 can extract data regarding the management service directory 214 such as devices 208 joined to the management service 212, memberships of roles and groups, administrators such as local administrators, device administrators, and users or accounts that perform the directory join, and log-on sessions with devices 208.

The data collected from data grabber 302 can be processed with connector 304 to form nodes that can be coupled together via edges, which represents lateral paths that may be susceptible to lateral path movements. The nodes can include nodes such as users, groups, and devices. The edges can include edges such as "Administrator to," "Member of," and "Had Session with." For example, a user node may be coupled to a group node of an administrator via "Member of" edge; a group node of an administrator may be coupled to a device node via "Administrator to" edge; and a user node, in which the user logged on to a device, may be coupled to the device node via "Had Session with" edge. The nodes and edges generated with the connector 304 can be presented to a security professional with reporter 306. In one example, the reporter 306 presents a visualization, such as an output on a display, of the nodes and edges. The visualization can include a graph of the nodes and edges that depict lateral paths and can highlight vulnerabilities for lateral movement paths through the network.

Figure 4:
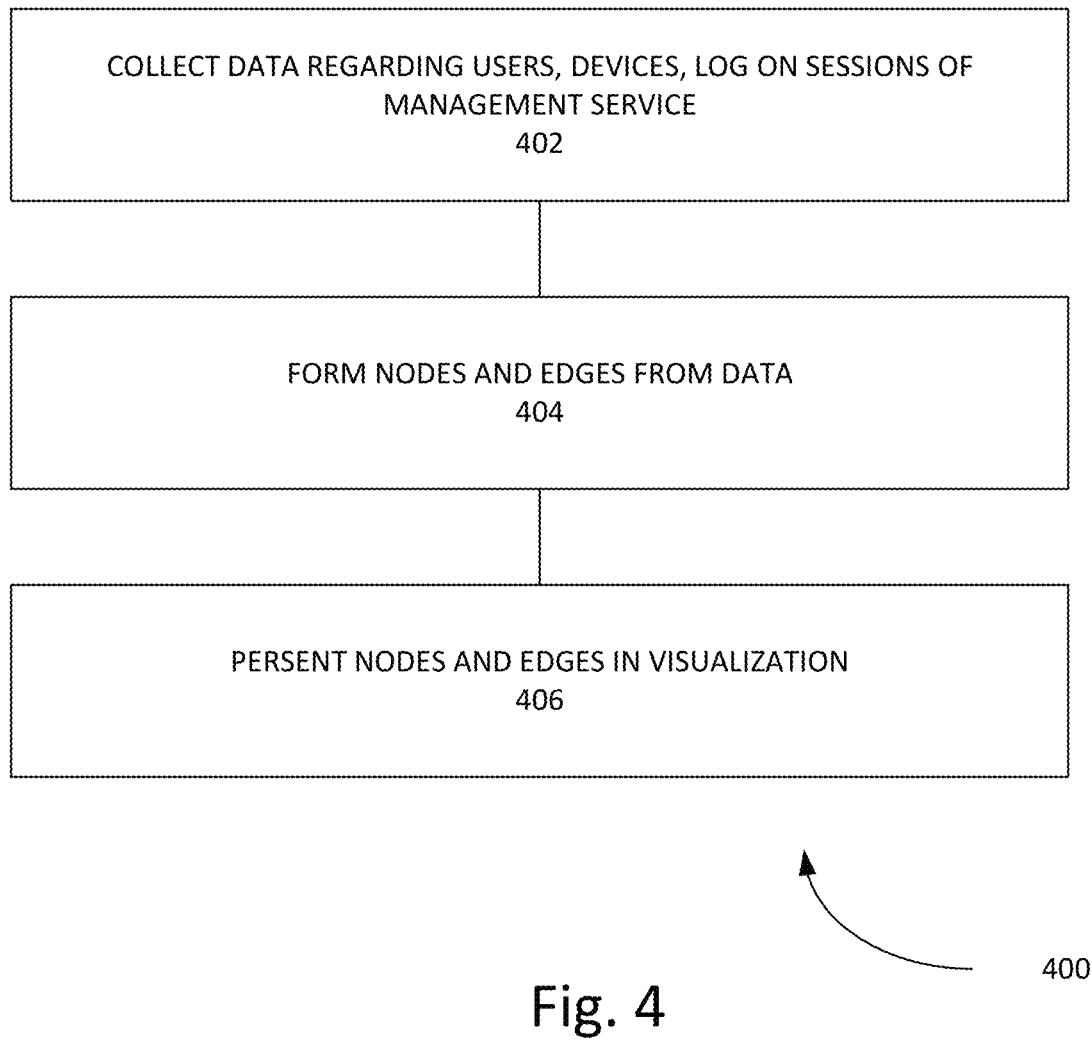
FIG. 4 is a block diagram illustrating an example method of the lateral movement path detector of FIG. 3.

FIG. 4 illustrates an example method 400 for use with the lateral movement path detector 300. The lateral movement path detector 300 can be applied to a management service directory 214 of management service 212 to identify lateral movement paths. Data regarding users, devices, and log on sessions of the management service 212 are collected at 402. In the example, the data is collected at 402 via programmatic access to the management service directory 214 through a REST API endpoint. The data collected at 402 includes devices joined to the management service directory 214 of management service 212 and the accounts and users of the devices 208, and all memberships of roles and groups of users; administrators of the management service directory 214 including local administrators, global administrators, device administrators, and users performing joins of the management service directory 214; and data regarding log on sessions for the device 208. The data collected at 402 is used to form nodes, which are coupled together via edges at 404. In the example, the nodes generated at 404 include users, groups and devices of the management service 212. The edges used to couple the nodes at 404 include "Administrator to," a group or user's connection to a device; "Member of," describing a user's or connection to a group, and "Had session with" describing a user's connection to a device. The collection of nodes and edges can be presented in whole or in part as a visualization at 406. For example, the nodes and edges of sensitive accounts or users can be depicted to determine if there are any vulnerabilities or lateral movement paths that can be addressed with additional security measures.

Figure 5:
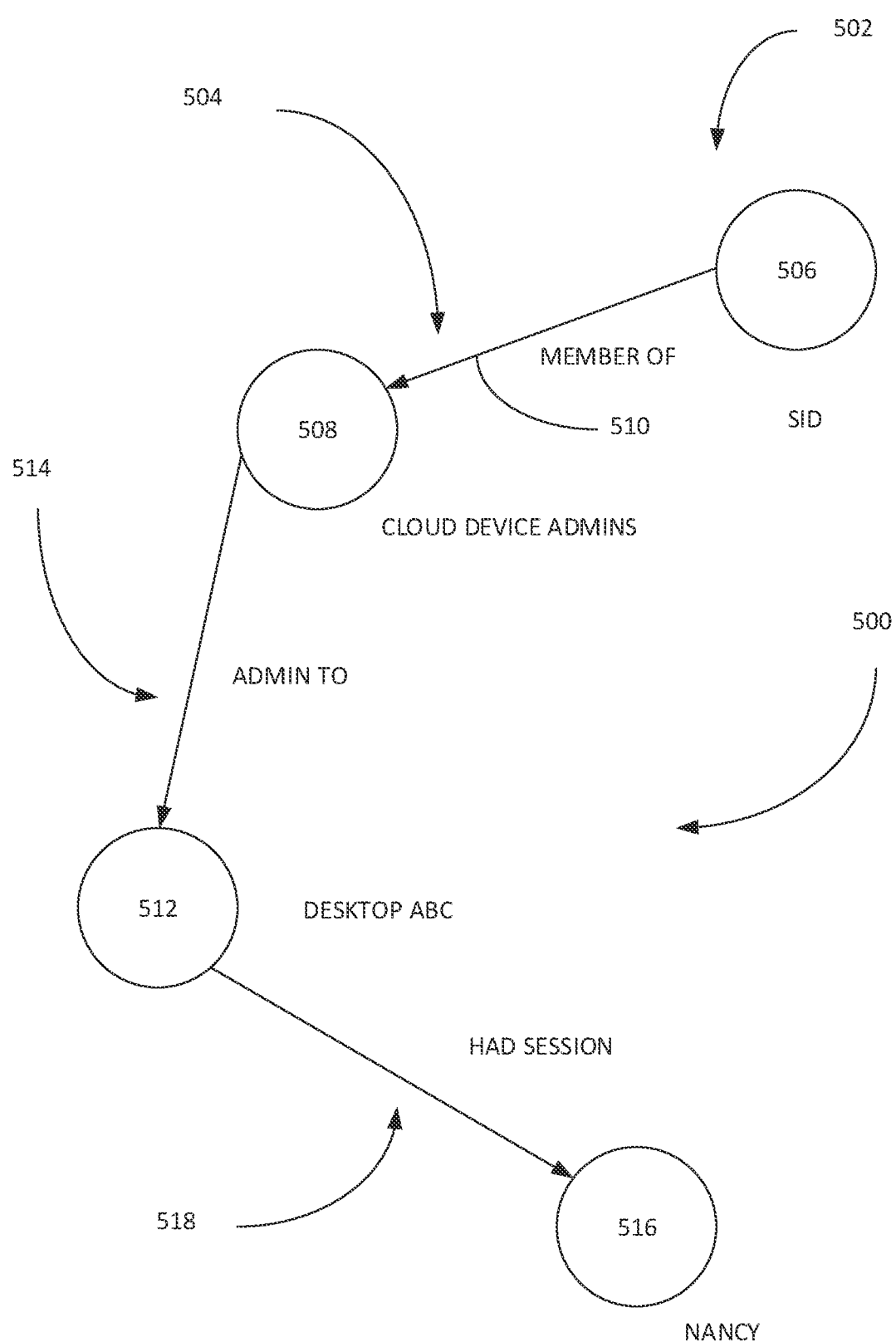
FIG. 5 is a block diagram illustrating an example visualization of the lateral movement path detector of FIG. 3.

FIG. 5 illustrates an example graph of a visualization 500 depicting nodes and edges as determined with lateral movement detector 300 employing the example method 500 on management service 212. Graph of the visualization depicts nodes 502 formed of users, groups, and devices of management service 212; and edges 504 connecting nodes 502, with edges 504 of "Administrator to," a group or user's connection to a device; "Member of," describing a user's or connection to a group, and "Had session with" describing a user's connection to a device. In this example, the node 506 represents a user Sid with a sensitive account. Node 506 is coupled to a Cloud Device Administrator group, represented by node 508, via edge 510 or "Member of" In this example, Sam is a member of the Cloud Device Administrator group of management service 212 as depicted in the graph. The Cloud Device Administrator group of node 508 is coupled to Desktop ABC, represented by node 512 via an "Administrator to" edge, represented by 514. In the example, the Cloud Device Administrator group is an administrator to all joined devices including Desktop ABC. Node 516 represents a user Nancy with a non-sensitive account. Node 516 is coupled to node 512 via edge 518 in that Nancy had a session with Desktop ABC. The graph can depict whether the session has been terminated or whether Nancy is still logged on to Desktop ABC. The graph illustrates a potential attack path from Nancy's account to Sid's account while logged onto Desktop ABC. The attack path can be exploited manually or via tools. A security professional, once made aware of the attack path via graph of visualization 400, can take steps to reduce risks or determine the source of attacks.

The example lateral movement path detector 300 and method 400, can be implemented to include a combination of one or more hardware devices and computer programs for controlling a system, such as a computing system having a processor and memory, to perform method 400. For instance, lateral movement path detector 300 and method 400 can be implemented as a computer readable medium or computer readable storage device having set of executable instructions for controlling the processor to perform the method 400. The lateral movement path detector 300 and method 400 can be included as a service in a cloud environment or part of a service in the cloud environment and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of detecting a lateral movement path, the method comprising:
    gathering data via programmatic access to a management service directory through a Representational State Transfer Application Programming Interface (REST API) endpoint;
    grouping the data into a graph having nodes of users, groups, and devices, the nodes coupled together via edges, the edges including an administrator edge, a member edge, and a session edge, a user node is coupled to a group node of an administrator via the member edge, a group node of an administrator is coupled to a device node via the administrator edge, and a user node logged on to a device is coupled to the device node via the session edge; and
    providing a visualization of the graph to illustrate lateral paths of the management service directory.

2. The method of claim 1 wherein the management service directory is included in a cloud-based identity and access management service.

3. The method of claim 2 wherein the cloud-based identity and access management service manages web-based services.

4. The method of claim 3 wherein the web-based services include software as a service applications.

5. The method of claim 1 wherein the edges represent relationships between the nodes.

6. The method of claim 1 wherein the nodes include users, groups, and devices in the management service directory.

7. The method of claim 6 wherein edges between the nodes of users and groups include a user's connection to a group.

8. The method of claim 6 wherein edges between the nodes of users or groups and devices include a user's or group's connection to a device.

9. The method of claim 1 wherein the visualization depicts lateral paths between sensitive accounts and non-sensitive accounts.

10. The method of claim 9 wherein the visualization depicts a lateral path from a non-sensitive user to a device to a group to a sensitive user.

11. A computer readable storage device to store computer executable instructions to control a processor to:
    gather data via programmatic access to a management service directory through a REST API endpoint;
    group the data into a graph having nodes of users, groups, and devices, the nodes coupled together via edges, the edges including an administrator edge, a member edge, and a session edge, a user node is coupled to a group node of an administrator via the member edge, a group node of an administrator is coupled to a device node via the administrator edge, and a user node logged on to a device is coupled to the device node via the session edge; and
    provide a visualization of the graph to illustrate lateral paths of the management service directory.

12. The computer readable storage device of claim 11 wherein the management service directory is included in a management service.

13. The computer readable storage device of claim 12 wherein the management service applies an authentication protocol of Security Assertion Markup Language (SAML) or Open Authorization (OAuth).

14. The computer readable storage device of claim 11 wherein the management service directory applies identity and access management of users, groups and applications of a cloud tenant.

15. The computer readable storage device of claim 11 wherein the instructions to gather data are configured as a data grabber.

16. The computer readable storage device of claim 15 wherein the data grabber employs REST calls and security permissions with protocols of a management service of the management service directory.

17. A system, comprising:
   a memory device to store a set of instructions; and
   a processor to execute the set of instructions to:
      gather data via programmatic access to a management service directory through a REST API endpoint;
      group the data into a graph having nodes of users, groups, and devices, the nodes coupled together via edges, the edges including an administrator edge, a member edge, and a session edge, a user node is coupled to a group node of an administrator via the member edge, a group node of an administrator is coupled to a device node via the administrator edge, and a user node logged on to a device is coupled to the device node via the session edge; and
      provide a visualization of the graph to illustrate lateral paths of the management service directory.

18. The system of claim 17 wherein the instructions are implemented with a security service of a cloud environment.

19. The system of claim 18 wherein the security service protects cloud-based assets and resources.

20. The system of claim 17 wherein the management service directory applies identity and access management of users, groups and applications of a cloud tenant.

* * * * *